United States Patent
Jin et al.

(10) Patent No.: US 10,702,825 B2
(45) Date of Patent: Jul. 7, 2020

(54) DEHUMIDIFICATION AIR CONDITIONING APPARATUS

(71) Applicant: SEIBU GIKEN CO., LTD., Fukuoka (JP)

(72) Inventors: Weili Jin, Fukuoka (JP); Koji Inoue, Fukuoka (JP); Ayako Kuroda, Fukuoka (JP); Hitomi Nishikokubaru, Fukuoka (JP); Kazuyuki Yoshida, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 223 days.

(21) Appl. No.: 16/038,610

(22) Filed: Jul. 18, 2018

(65) Prior Publication Data
US 2019/0022574 A1   Jan. 24, 2019

(30) Foreign Application Priority Data
Jul. 19, 2017 (JP) .................. 2017-139547

(51) Int. Cl.
B01D 53/06 (2006.01)
F24F 3/14 (2006.01)
B01D 53/26 (2006.01)

(52) U.S. Cl.
CPC ........ B01D 53/06 (2013.01); B01D 53/261 (2013.01); F24F 3/1405 (2013.01);
(Continued)

(58) Field of Classification Search
CPC ............. B01D 53/06; B01D 53/261; B01D 2253/106; B01D 2253/108; B01D 2253/1124; B01D 2253/202; B01D 2253/3425; B01D 2257/504; B01D 2257/80; B01D 2259/40086;
(Continued)

(56) References Cited

U.S. PATENT DOCUMENTS 3,865,924 A * 2/1975 Gidaspow .............. B01D 53/02
                                                        423/230
6,500,236 B2 * 12/2002 Suzuki ................... B01D 53/06
                                                        95/113

(Continued)

FOREIGN PATENT DOCUMENTS

JP        2014-97437        5/2014
JP        2016-2519         1/2016

Primary Examiner — Frank M Lawrence, Jr.
(74) Attorney, Agent, or Firm — Staas & Halsey LLP

(57) ABSTRACT

Outside air is cooled and dehumidified by a pre-cooler to pass through an adsorption zone of a carbon dioxide adsorbing rotor, producing air having a low carbon dioxide concentration which is cooled by an intercooler. The air that has passed through the intercooler is passed through an adsorption zone of a moisture adsorption rotor and then supplied to a low humidity working chamber. Return air from the low humidity working chamber may be mixed with the air leaving the pre-cooler. A part of the air which passed through the intercooler is branched to pass through a purge zone of the moisture adsorption rotor before being sent to a regeneration zone of the humidity adsorption rotor. Air that passed through the regeneration zone of the humidity adsorption rotor is mixed with outside air and then passed through a regeneration zone of the carbon dioxide adsorption rotor before being exhausted.

13 Claims, 2 Drawing Sheets

(52) U.S. Cl.
CPC ...... *F24F 3/1423* (2013.01); *B01D 2253/106* (2013.01); *B01D 2253/108* (2013.01); *B01D 2253/1124* (2013.01); *B01D 2253/202* (2013.01); *B01D 2253/3425* (2013.01); *B01D 2257/504* (2013.01); *B01D 2259/4009* (2013.01); *B01D 2259/40086* (2013.01); *B01D 2259/4508* (2013.01); *B01D 2259/65* (2013.01); *F24F 2003/1458* (2013.01); *F24F 2203/10* (2013.01); *F24F 2203/1016* (2013.01); *F24F 2203/1056* (2013.01); *F24F 2203/1072* (2013.01); *F24F 2203/1084* (2013.01); *F24F 2203/1088* (2013.01); *Y02C 10/08* (2013.01)

(58) Field of Classification Search
CPC .... B01D 2259/4009; B01D 2259/4508; B01D 2259/65; Y02C 20/08; F24F 3/1405; F24F 3/1423; F24F 2003/1458; F24F 2203/10; F24F 2203/1016; F24F 2203/1056; F24F 2203/1072; F24F 2203/1084; F24F 2203/1088
USPC .... 95/117, 139, 113; 96/125, 126, 132, 146, 96/150
See application file for complete search history.

(56) References Cited

U.S. PATENT DOCUMENTS

| | | | |
|---|---|---|---|
| 2012/0000365 A1* | 1/2012 | Okano | B01D 53/06 96/144 |
| 2012/0068119 A1* | 3/2012 | Kametani | B01D 53/06 252/372 |
| 2014/0175336 A1* | 6/2014 | Gupta | B01D 53/06 252/373 |
| 2015/0007725 A1* | 1/2015 | Elliott | B01D 53/62 95/113 |

* cited by examiner

DEHUMIDIFICATION AIR CONDITIONING APPARATUS

CROSS REFERENCE TO RELATED APPLICATION

This application is based on and hereby claims priority to Japanese Patent Application No. 2017-139547 filed on Jul. 19, 2017, the contents of which are hereby incorporated by reference.

BACKGROUND

The present invention relates to a dehumidification air conditioning apparatus.

If dehumidification is not carried out in the manufacture plant of a lithium ion battery, a problem in the quality of the lithium ion battery arises. That is, since lithium reacts to moisture strongly, the manufacture plant of the lithium ion battery needs to set the dew point as minus 30 Celsius or less (Hereinafter, all temperatures are assumed to be "Celsius temperature scale").

In addition, it has been elucidated that a nickel based anode material of the lithium ion battery adsorbs water and carbon dioxide to form a lithium compound with lithium ions eluted from an inside of the anode material, thereby deteriorating the electrode and cycle characteristics of the battery.

Thus, in order to make the environment where carbon dioxide levels are low at the low dew point, there is a method of making liquid nitrogen evaporate and making the air in a plant replace by nitrogen. However, in this method, there is a problem of it becoming impossible for humans to enter in the plant.

Considering the problem, in order to make low dew point environment, the method of using the adsorption-type dehumidification air conditioner which used humidity adsorbent is realistic, and many plants use this method. However, there is a problem that carbon dioxide levels cannot be made low.

Then, a Patent Document 1, Japanese Patent Laid-Open Publication No. 2014-97437, discloses a technology for making the low dew point environment where carbon dioxide levels are low. The technology disclosed in the Patent Document 1 performs indoor dew point control with sufficient accuracy and can also make carbon dioxide levels low. However, since carbon dioxide adsorbent such as sodium hydroxide is used, the carbon dioxide adsorbent needs to be exchanged for new carbon dioxide adsorbent if a capability of the carbon dioxide adsorption declines after time has passed.

There is a method disclosed in a Patent Document 2, Japanese Patent Laid-Open Publication No. 2016-2519, as a technology which solves the problem of carbon dioxide adsorbent exchange of the Patent Document 1. The method disclosed in the Patent Document 2 controls the indoor dew point and the carbon dioxide levels using a humidity and carbon dioxide adsorption rotor by controlling the number of rotations of the rotor.

SUMMARY

As stated above, the technologies disclosed in the Patent Document 1 and that of the Patent Document 2 can make the low dew point environment in a condition of low indoor carbon dioxide levels. As to the both technologies, since its indoor capacity is about 1-3 $m^3$ and a comparatively small device for glove boxes is used, it is equipped with gloves such as a product made of rubber so that humans hygroscopic surface moisture may not enter indoors. Therefore, for the both technologies, there was a problem of being inapplicable in a low humidity workroom like a dry room where humans enter to work indoors such as the manufacture plant of the lithium ion battery.

The inventors aim to solve the above-stated problems. One possible object is to provide the dehumidification air conditioning apparatus which can make a low concentration of carbon dioxide in a low humidity workroom where indoor capacity is comparatively large and where humans can enter to work inside.

The inventors' proposal has a pre-cooler for cooling open air. First, the air cooled and dehumidified by the pre-cooler is passed through an adsorption zone of a carbon dioxide adsorption rotor. Next, the air which became low in carbon dioxide level is passed through an adsorption zone of a humidity adsorption rotor. A main characteristic is that, by passing the air in different conditions through such zones using the pre-cooler, the dry air with low carbon dioxide level can be provided indoors.

The proposed dehumidification air conditioning apparatus can lower the dew point temperature in a drying large chamber such as a dry room and can also lower carbon dioxide levels further by using a carbon dioxide adsorption rotor and a humidity adsorption rotor.

Also, by changing the type of the carbon dioxide adsorption rotor, it becomes possible to provide an apparatus which can return air from the dry room to the dehumidifying air conditioner and an apparatus which cannot return the air, called "one pass".

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
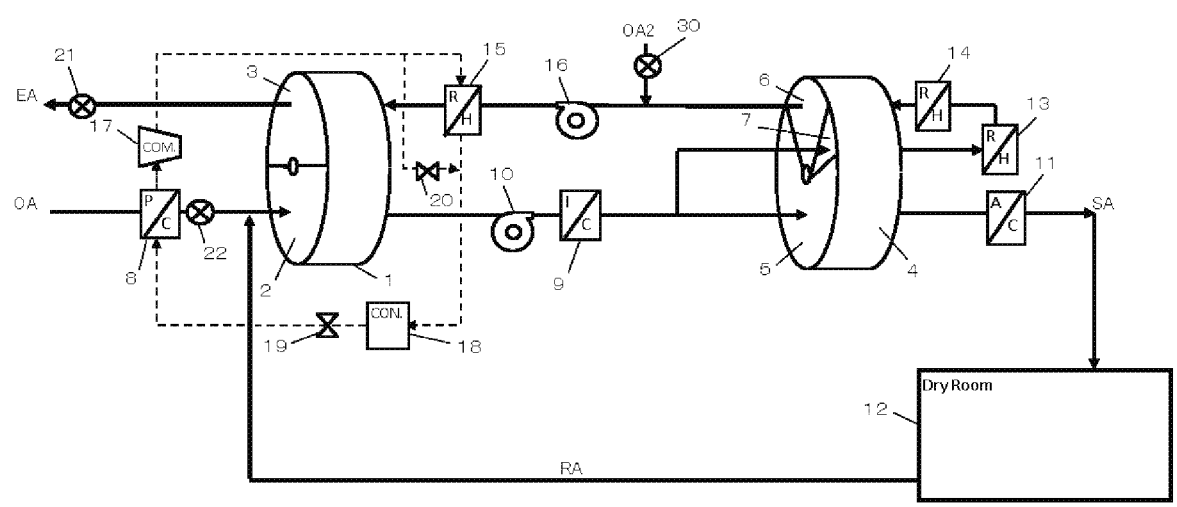
FIG. 1 is a schematic flow diagram showing a first preferred embodiment of the proposed dehumidifier.

Reference will now be made in detail to the preferred embodiments of the present invention, examples of which are illustrated in the accompanying drawings, wherein like reference numerals refer to like elements throughout.

According to the inventors' proposals, air having a low carbon dioxide concentration by passing through an adsorption zone of a carbon dioxide adsorption rotor is passed through an adsorption zone of a moisture adsorption rotor and is supplied into a room to lower the carbon dioxide concentration of the supplied air. Thereby, the object to provide a dehumidifying air conditioning apparatus that makes the supplied air a low dew point is realized.

A first potential preferred embodiment of the inventors' proposals is described along FIG. 1 as follows. As for open air OA, dust is removed by an air filter (not shown). When this open air is cooled by a precooler 8, dehumidification by dew condensation is performed. Air discharged from the precooler 8 is adjusted in air volume by a damper 22 and then mixed with return air RA from a low humidity working chamber 12 by a fan 10. Further, the mixed air is passed through an adsorption zone 2 of a carbon dioxide adsorbing rotor 1.

The carbon dioxide adsorption rotor 1 is manufactured using the following materials so that it may not have influence against humidity of the adsorption performance of carbon dioxide. Namely, the materials are glass fiber paper, textiles papers made of resin such as PET (polyethylene terephthalate) and PP (polypropylene), metallic foil such as aluminum, and nonflammable sheets of a resin sheet, etc. These materials are processed by corrugating (wave attachment) to be produced by twisting (rolling and/or laminating) in a shape of a rotor. In the twisted product, an amine-supported solid absorbent capable of regenerating at a low temperature of 60° C. or less is supported using an inorganic binder or an organic binder such as a vinyl acetate type or an acrylic type. Also, the twisted product is a publicly known thing and is supported by silica, zeolite, ion-exchange resin, etc. which adsorbs carbon dioxide on a honeycomb rotor. Also, the carbon dioxide adsorption rotor 1 is divided into an adsorption zone 2 and a reproduction zone 3. Furthermore, the carbon dioxide adsorption rotor 1 is rotated to drive by a geared motor (not shown), etc.

The air which has passed through the adsorption zone 2 and of which carbon dioxide levels has become low is sent to an intercooler 9 through a fan 10. The air which has passed through the intercooler 9 is branched on two ways so that it may send to an adsorption zone 5 of a humidity adsorption rotor 4, which adsorbs carbon dioxide and moisture simultaneously in a low dew point region having a dew point of minus 10 degrees Celsius (hereinafter referred to as "−10° C. DP") and a purge zone 7. The air of which carbon dioxide level has become low and which the dew point low has been reduced by passing through the adsorption zone 5 is lowered to a predetermined temperature by an after cooler 11, and is supplied to a low humidity workroom 12.

The air that has passed through the purge zone 7 is passed through a regeneration heater 13 and a regeneration heater 14 to heat to a temperature necessary to regenerate the moisture adsorption rotor 4 which adsorbs carbon dioxide simultaneously with moisture in the low dew point region below −10° C. DP, and the heated air is sent to the regeneration zone 6. In the present embodiment, two regeneration heaters are used because factory waste heat such as steam is used as a heat source for heating the regeneration air of the regeneration heater 13. However, the inventors proposals are not limited to this, and the regeneration of the moisture adsorption rotor 4 may be performed with a single regeneration heater.

The air which has come out of the reproduction zone 6 is mixed with open air OA2 which had the flow rate adjusted by a valve 30, and the mixed air is heated by a reproduction heater 15 after passing a fan 16. Then, the heated air is sent to the reproduction zone 3 of carbon dioxide adsorption rotor 1. Here, mixing of the air leaving the regeneration zone 6 with the outside air OA 2 is intended to increase the amount of carbon dioxide desorbed in the regeneration zone 3 by increasing the regeneration air volume and to improve the ability to desorb carbon dioxide of the amine-supported solid absorbent carried on the carbon dioxide adsorbing rotor 1 by increasing an absolute humidity of the regeneration air of the carbon dioxide adsorbing rotor 1. Since the quantity of the moisture carried into adsorption zone 2 from reproduction zone 3 also increases as compared with the case where open air OA2 is not taken in, the joint reaction between the amino group which an amine support solid absorbent has and carbon dioxide is promoted and the carbon dioxide adsorption capability in adsorption zone 2 also improves. A valve 21 adjusts the flow rate of the air which has passed through reproduction zone 3 of carbon dioxide adsorption rotor 1, and the adjusted air is emitted outside as exhaust air EA. Since the heat pump waste heat of the precooler 8 is used as a heat source of the regeneration heater 15, the energy saving performance of the entire system can also be improved.

The heat pump circuit in pre-cooler 8 is shown with a dashed line in FIG. 1. This heat pump circuit comprises a compressor 17, an evaporator used for pre-cooler 8, two condensation machines used for a reproduction heater 15 and a condensation machine 18 for heat dissipation, and an expansion valve 19. The gasified refrigerant which is taken out from the compressor 17 is sent to a condensation machine of reproduction heater 15. The temperature of the air sent to the regeneration zone 3 is measured by a temperature controller (not shown) or the like. The air is branched into gas to be sent to the regeneration heater 15 and gas bypassed by the pressure regulating valve 20 without passing through the regeneration heater 15. Furthermore, by regulating the flow rate of the gas, it is adjusted to a predetermined regeneration temperature. The gas which has passed through the reproduction heater 15 is sent to a condensation machine 18 for heat dissipation. Then, the liquefied refrigerant is decompressed and expanded by the expansion valve 19, is supplied to the evaporator used for the pre-cooler 8, cools the air to be processed, and returns to the compressor 17 to form a circulation system.

In a case where a volume of low humidity workroom 12 is 1,188 $m^3$ and the number of the people in the room is 8, if the temperature of open air is 35 degrees and the dew point temperature is 30.1 degrees as summer conditions, the outside air treatment air volume (OA) is set to 2,619 $m^3/h$, a supply air flow rate to the low humidity workroom 12 (SA) is set to 7,916 $m^3/h$ and the return air volume (RA) is set to 6,728 $m^3/h$, the temperature of supply air to low humidity workroom 12 becomes 15.5 degrees, the dew point temperature becomes −63 degrees and the carbon dioxide level reach to 50 ppm. At this time, an outlet temperature of the regeneration heater 15 of the carbon dioxide adsorption rotor 1 is 55 degrees and an outlet temperature of the regeneration heater 14 of the moisture adsorption rotor 4 is 220 degrees.

Figure 2:
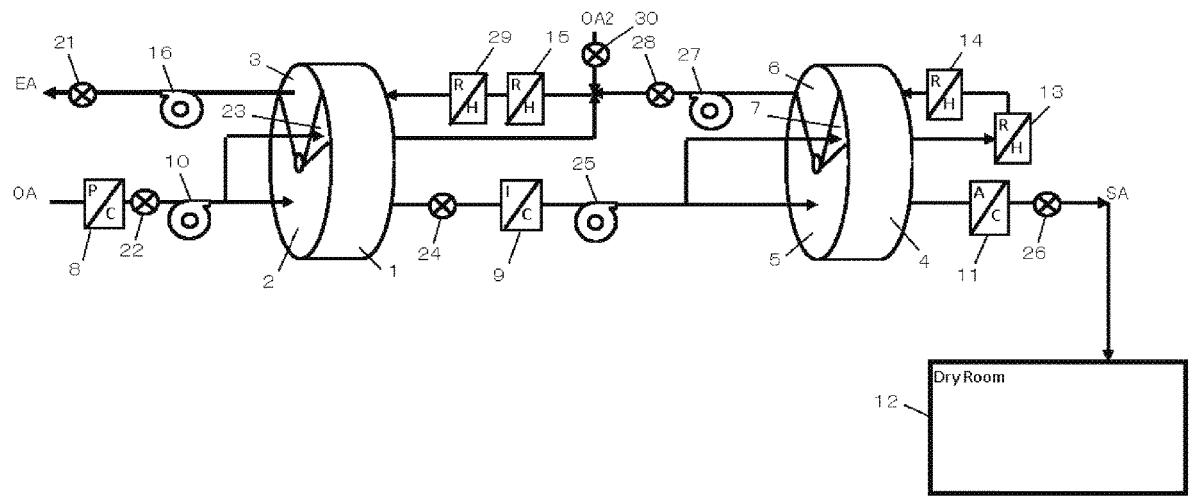
FIG. 2 is a schematic flow diagram showing a second preferred embodiment of the proposed dehumidifier.

Next, a second potential preferred embodiment of the inventors' proposals is described along with FIG. 2. In the preferred embodiment 1, the return air RA from the low humidity working chamber 12 is used. However, in the preferred embodiment 2, the embodiment is suitable for the case where the return air RA from the low humidity working room 12 cannot be used because organic solvent gas with strong flammability, gas harmful to the human body, and/or the gas which deteriorates carbon dioxide adsorbing rotor 1 and the moisture adsorption rotor 4 is generated in the low humidity working room. First, dusts in the open air OA are removed by the air filter (not shown). Dehumidification by dew condensation is performed by cooling this open air in precooler 8. The air discharged from the pre-cooler 8 is adjusted in air volume by the damper 22, branched into two routes by the fan 10, and passed through the adsorption zone 2 and the purge zone 23 of the carbon dioxide removal rotor 1, respectively.

The carbon dioxide adsorption rotor 1, which is not easily influenced by humidity, is made by corrugating non-flammable sheets such as sheets formed of glass fiber paper and/or ceramic fiber paper and further by processing to wrap them in a rotor shape. By using an inorganic binder or the like, the wrapped product carries potassium carbonate or sodium carbonate and the carbon dioxide capture material composed of the ionic liquid or an oxide of Ce, which can adsorb carbon dioxide even if there is humidity. The carbon dioxide adsorption rotor 1 is divided into an adsorption zone 2, a reproduction zone 3, and a purge zone 23. Also, the carbon dioxide adsorption rotor 1 is rotated to drive by a geared motor (not shown), etc.

The air which has passed through the adsorption zone 2 from the fan 10 and of which carbon dioxide levels has become low is sent to the intercooler 9 via a valve 24. The air which has passed through the intercooler 9 is moved via a fan 25 and branched two ways so that it may be sent to the adsorption zone 5 of the rotor 4 which carries 13× zeolite, 5 A zeolite, or LSX zeolite and to the purge zone 7. These materials also absorb carbon dioxide simultaneously with humidity in the low dew point region below −10° C. D.P. The air which has passed through the adsorption zone 5 to have a lower carbon dioxide concentration and an ultra-low dew point of −50° C. or less is cooled to be lowered to a predetermined temperature by the aftercooler 11 and is introduced into the low-humidity working room 12 via a valve 26.

Also, the air which has passed through the purge zone 7 is heated to a temperature required for reproduction of the humidity adsorption rotor 4 with reproduction heater 13 and reproduction heater 14, and is sent to the reproduction zone 6. In the preferred embodiment, since steamy factory exhaust heat is used as the heat source of heating of the reproduction air of reproduction heater 13, two reproduction heaters are used. However, the inventors' proposals are not limited to this and may reproduce the humidity adsorption rotor 4 with a single reproduction heater.

After the air which has come out of the reproduction zone 6 is mixed with the open air OA2 which had the flow rate adjusted with the valve 30 through the fan 27 and the air which was passed through the purge zone 23 of the carbon dioxide adsorption rotor 1, the air is heated with the reproduction heater 15 and the reproduction heater 29 and is sent to the reproduction zone 3 of the carbon dioxide adsorption rotor 1. The air has passed through the regeneration zone 3 is adjusted in air volume by a valve 21 and discharged to the outside as exhaust EA. The amount adjustment of air is carried out by valve 21, and the air which passed through reproduction zone 3 is emitted outside as exhaust air EA. In this embodiment, two regeneration heaters are used for regeneration of the moisture adsorption rotor 4. However, the inventors' proposals are not limited to this, and regeneration of the carbon dioxide adsorption rotor 1 may be performed by a single regeneration heater.

In a case where a volume of the low humidity workroom 12 is 440 m$^3$ and the number of the people in the room is 0, if a temperature of open air is 35 degrees and the dew point temperature is 27 degrees as summer conditions, the outside air treatment air volume (OA) is set to 10,570 m$^3$/h, the supply air flow rate to the low humidity workroom 12 (SA) is set to 6,786 m$^3$/h, the temperature of supply air becomes 25 degrees, the dew point temperature becomes −50 degrees and the carbon dioxide level reaches to 30 ppm. At this time, an outlet temperature of the regeneration heater 29 of the carbon dioxide adsorption rotor 1 is 220 degrees, and an outlet temperature of the regeneration heater 14 of the moisture adsorption rotor 4 which absorbs carbon dioxide simultaneously with moisture in the low dew point region below −10° C. D.P. is 220 degrees.

According to the inventors' proposals, as described above, by using the carbon dioxide adsorbing rotor and a rotor which adsorbs carbon dioxide at the same time as moisture in a low dew point region below −10° C. DP, the carbon dioxide concentration in the low humidity working chamber is 100 ppm or less, it is possible to provide a controllable dehumidifying air-conditioning apparatus.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A dehumidification air conditioning apparatus comprising:
    a pre-cooler which cools and dehumidifies outside air;
    a carbon dioxide adsorption rotor divided into at least a reproduction zone and an adsorption zone, the adsorption zone receiving a mixed air produced by mixing return air from a dry room supply destination, with outside air after the outside air has passed through the pre-cooler;
    an intercooler which receives air that has passed through the adsorption zone of the carbon dioxide adsorption rotor, to produce cooled air;
    a humidity adsorption rotor divided into at least a regeneration zone, an adsorption zone and a purge zone, the purge zone of the humidity adsorption rotor receiving a first part of the cooled air which has passed through the intercooler, the adsorption zone of the humidity adsorption rotor receiving a second part of the cooled air which has passed through the intercooler, to thereby produce dehumidified air;
    an aftercooler which regulates a temperature of the dehumidified air from the adsorption zone of the humidity adsorption rotor, to thereby produce supply air that is supplied to the dry room supply destination;
    a regeneration heater which heats air that has passed through the purge zone of the humidity adsorption rotor, to produce heated air that is passed through the regeneration zone of the humidity adsorption rotor; and
    a reproduction heater to heat a combined air produced by combining air that has passed through said regeneration zone of said humidity adsorption rotor with outside air, the reproduction heater producing reproduction air that is passed through said reproduction zone of said carbon dioxide adsorption rotor, wherein
    the reproduction air which has passed through said reproduction zone of said carbon dioxide adsorption rotor is exhausted.

2. A dehumidification air conditioning apparatus according to claim 1, further comprising a heat pump having a condenser,
    wherein the condenser of the heat pump is used as the reproduction heater for said carbon dioxide adsorption rotor.

3. A dehumidification air conditioning apparatus according to claim 1, further comprising a heat pump having a condenser and an evaporator,
    wherein the condenser of the heat pump is used as the reproduction heater for said carbon dioxide adsorption rotor, and
    wherein the evaporator of the heat pump is used as the pre-cooler.

4. A dehumidifying air conditioning apparatus according to claim 1, wherein the carbon dioxide adsorption rotor supports a solid amine absorbent using an organic or inorganic binder.

5. A dehumidifying air conditioning apparatus according to claim 1, wherein
the carbon dioxide adsorption rotor supports a solid amine absorbent using an organic binder, and
the organic binder is selected from the group consisting of a vinyl acetate binder and an acryl binder.

6. A dehumidifying air conditioning apparatus according to claim 1, wherein
the carbon dioxide adsorption rotor is a honeycomb rotor,
the honeycomb rotor comprises a sheet material that supports a solid amine absorbent using a binder,
the sheet material is formed from a material selected from the group consisting of glass fiber, polyethylene terepthalate, polypropylene and a metal foil, and
the sheet material is corrugated and then processed by at least one of rolling and laminating.

7. A dehumidification air conditioning apparatus according to claim 1, wherein
the humidity adsorption rotor adsorbs both carbon dioxide and humidity, and
the dehumidified air from the adsorption zone of the humidity adsorption rotor has a dew point of −10° C. Dew Point or less.

8. A dehumidifying air conditioning apparatus according to claim 1, wherein
the humidity adsorption rotor carries a zeolite or a silica absorbent.

9. A dehumidification air conditioning apparatus comprising:
a pre-cooler which cools and dehumidifies outside air;
a carbon dioxide adsorption rotor divided into at least a reproduction zone, an adsorption zone and a purge zone, the purge zone of the carbon dioxide adsorption rotor receiving a first part of the outside air after the outside air has passed through the pre-cooler, the adsorption zone of the carbon dioxide adsorption rotor receiving a second part of the outside air after the outside air has passed through the pre-cooler;
an intercooler which receives air that has passed through the adsorption zone of the carbon dioxide adsorption rotor, to produce cooled air;
a humidity adsorption rotor divided into at least a regeneration zone, an adsorption zone and a purge zone, the purge zone of the humidity adsorption rotor receiving a first part of the cooled air which has passed through the intercooler, the adsorption zone of the humidity adsorption rotor receiving a second part of the cooled air which has passed through the intercooler, to thereby produce dehumidified air;
an aftercooler which regulates a temperature of the dehumidified air from the adsorption zone of the humidity adsorption rotor, to thereby produce supply air that is supplied to a dry room supply destination;
a regeneration heater which heats air that has passed through the purge zone of the humidity adsorption rotor, to produce heated air that is passed through the regeneration zone of the humidity adsorption rotor; and
a reproduction heater to heat a combined air produced by combining air that has passed through said regeneration zone of said humidity adsorption rotor with outside air, the reproduction heater producing reproduction air that is passed through the reproduction zone of said carbon dioxide adsorption rotor, wherein
the reproduction air which has passed through the reproduction zone of said carbon dioxide adsorption rotor is exhausted.

10. A dehumidification air conditioning apparatus according to claim 9, wherein
said carbon dioxide adsorption rotor carries a carbon dioxide capture material formed of an oxide of cerium, and
the carbon dioxide capture material is carried by the carbon dioxide adsorption rotor using an inorganic binder.

11. A dehumidifying air conditioning apparatus according to claim 9, wherein
the carbon dioxide adsorption rotor is a honeycomb rotor,
the honeycomb rotor comprises a sheet material that supports a cerium oxide absorbent using an inorganic binder,
the sheet material is formed from a non-flammable material selected from the group consisting of glass fiber and ceramic fiber, and
the sheet material is corrugated and then processed by at least one of rolling and laminating.

12. A dehumidification air conditioning apparatus according to claim 9, wherein
the humidity adsorption rotor adsorbs both carbon dioxide and humidity, and
the dehumidified air from the adsorption zone of the humidity adsorption rotor has a dew point of −10° C. Dew Point or less.

13. A dehumidifying air conditioning apparatus according to claim 9, wherein
a humidity adsorption rotor carries a zeolite or a silica absorbent.

* * * * *

UNITED STATES PATENT AND TRADEMARK OFFICE
CERTIFICATE OF CORRECTION

PATENT NO.         : 10,702,825 B2
APPLICATION NO.    : 16/038610
DATED              : July 7, 2020
INVENTOR(S)        : Weili Jin et al.

Page 1 of 1

It is certified that error appears in the above-identified patent and that said Letters Patent is hereby corrected as shown below:

In the Claims

Column 6, Line 66, In Claim 4, delete "dehumidifying" and insert -- dehumidification --, therefor.

Column 7, Line 3, In Claim 5, delete "dehumidifying" and insert -- dehumidification --, therefor.

Column 7, Line 9, In Claim 6, delete "dehumidifying" and insert -- dehumidification --, therefor.

Column 7, Line 26, In Claim 8, delete "dehumidifying" and insert -- dehumidification --, therefor.

Column 8, Line 26 (approx.), In Claim 11, delete "dehumidifying" and insert -- dehumidification --, therefor.

Column 8, Line 44 (approx.), In Claim 13, delete "dehumidifying" and insert -- dehumidification --, therefor.

Column 8, Line 46 (approx.), In Claim 13, delete "a" and insert -- the --, therefor.

Signed and Sealed this
Twenty-fifth Day of August, 2020

Andrei Iancu
*Director of the United States Patent and Trademark Office*